Figure 1:
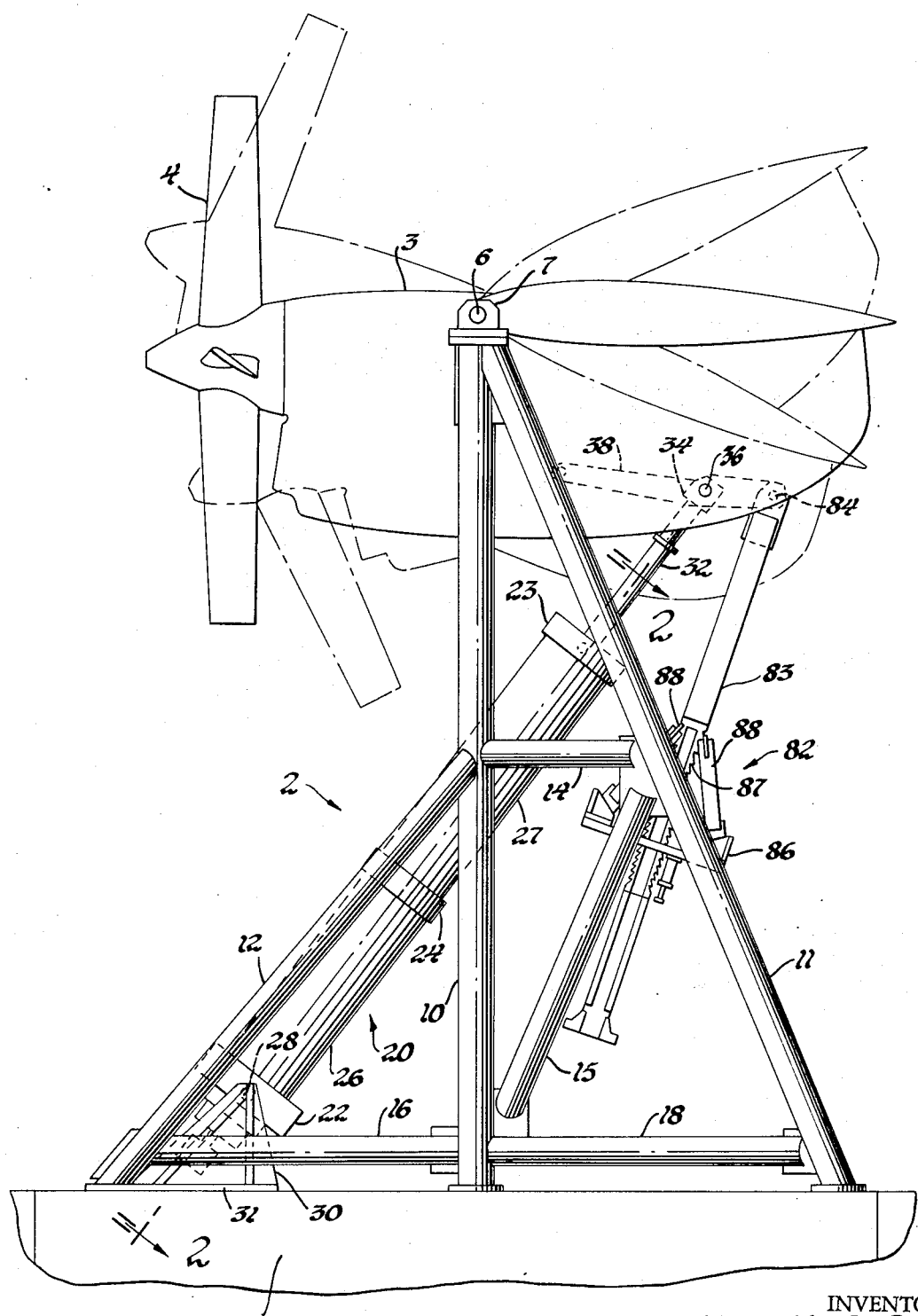

United States Patent
Dye

[11] 3,710,690
[45] Jan. 16, 1973

[54] ACCELERATOR
[75] Inventor: Kenneth R. Dye, Indianapolis, Ind.
[73] Assignee: General Motors Corporation, Detroit, Mich.
[22] Filed: Nov. 16, 1970
[21] Appl. No.: 89,823

[52] U.S. Cl..................91/411 A, 92/62, 92/85, 92/152
[51] Int. Cl........F15b 11/06, F01b 7/00, F01b 11/02
[58] Field of Search......92/61, 62, 150, 151, 134, 85, 92/17, 152; 91/411 A, 413, 170, 171

[56] References Cited

UNITED STATES PATENTS

| | | | |
|---|---|---|---|
| 3,018,762 | 1/1962 | Korb | 91/170 R |
| 3,559,538 | 2/1971 | Holden | 92/85 |
| 3,149,537 | 9/1964 | Fink | 92/62 X |
| 1,925,444 | 9/1933 | Greishaber | 92/152 |
| 3,173,659 | 3/1965 | Hemmeter | 92/17 X |
| 2,782,766 | 2/1957 | Bodem | 92/17 |
| 2,819,589 | 1/1958 | Geyer | 92/17 |
| 3,285,287 | 11/1966 | Curran | 92/62 X |
| 3,309,062 | 3/1967 | Jansz | 92/17 |

Primary Examiner—Martin P. Schwadron
Assistant Examiner—A. M. Ostrager
Attorney—Paul Fitzpatrick and Jean L. Carpenter

[57] ABSTRACT

A pneumatic cylinder and piston actuator for successively accelerating and decelerating a structure to be tested. It includes a reservoir for gas under pressure, an accelerating cylinder and piston, and a decelerating cylinder and piston, the latter being of smaller diameter but longer stroke than the former. Upon release of a pneumatic pressure hold down, the accelerating piston, actuated by reservoir pressure, accelerates both pistons. Upon termination of the stroke of the accelerating piston the reservoir pressure decelerates the other piston, which is connected to the device to be tested. A non-return device terminates each such cycle, after which the actuator is reset.

8 Claims, 5 Drawing Figures

INVENTOR.
Kenneth R. Dye
BY
Paul Fitzpatrick
ATTORNEY

ACCELERATOR

The invention herein described was made in the course of work under a contract, or subcontract thereunder, with the Department of Defense.

DESCRIPTION

My invention relates to a fluid pressure device for first accelerating and then decelerating a load. It was conceived in response to a requirement for an actuator to impart a rapid pitching movement to an aircraft engine and propeller combination, to investigate the sturdiness of the reduction gear which is a part of the combination, and to provide insight into possible improvements in the structure of the reduction gear. However, as will be apparent from the succeeding description, the accelerator is capable of use in various applications for smooth acceleration of considerable magnitude of a device to be tested.

The principal objects of my invention are to provide apparatus particularly suited to test structures and machines under strong transient loads; a further object of the invention is to provide a simple, reliable, and conveniently operated accelerating and decelerating actuator device; a further object is to provide a substantially self-contained and reliable accelerating-decelerating motor; a still further object of the device is to provide superior means for initiating the operation of a pneumatic actuator.

The nature of my invention and its advantages will be clear to those skilled in the art from the succeeding detailed description and accompanying drawings of the preferred embodiment of the invention.

However, by way of introduction to the description, it may be pointed out that, in its preferred embodiment, my invention involves an assembly of a pressure vessel containing gas under pressure and two coaxial cylinder and piston motors; an accelerating cylinder of relatively large diameter and short stroke and a decelerating cylinder of smaller diameter and longer stroke. Upon release of the accelerating cylinder, its piston moves to push the piston of the decelerating cylinder through the stroke of the accelerating cylinder, after which the reservoir pressure is effective to decelerate the decelerating piston. The piston rod of the decelerating cylinder thus is moved through a cycle consisting of a substantially constant acceleration followed immediately by substantially constant deceleration. The device includes pneumatic pressure means for releasing or initiating the stroke of the accelerating piston and includes an arrangement for locking the decelerating piston at the conclusion of its stroke and, further, pneumatic means for gradually controllably returning the pistons to their initial position for a repeated cycle.

Referring now to the drawings for a disclosure of the preferred embodiment of the invention:

FIG. 1 is an elevation view of an aircraft engine test stand.

Figure 2:
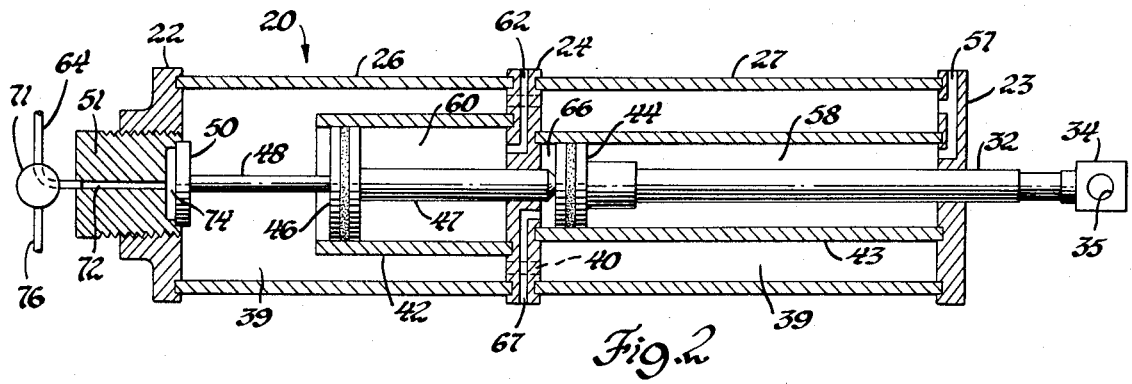
Figure 3:
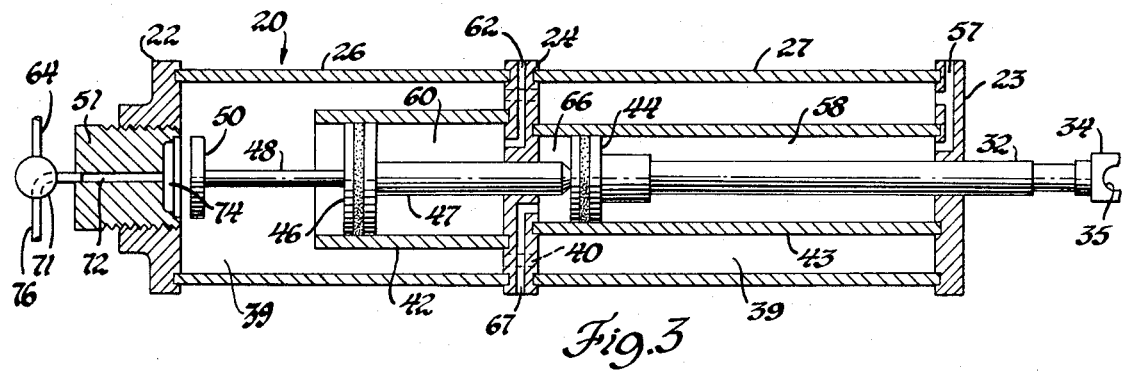
Figure 4:
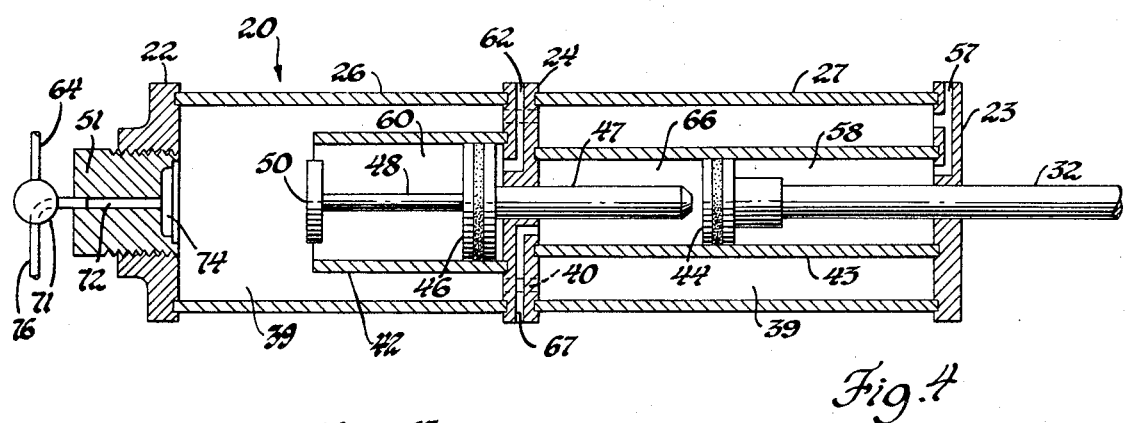

FIGS. 2, 3, and 4 are longitudinal sectional views of my accelerating-decelerating device in various phases of operation, taken on the plane indicated by the line 2—2 in FIG. 1.

Figure 5:
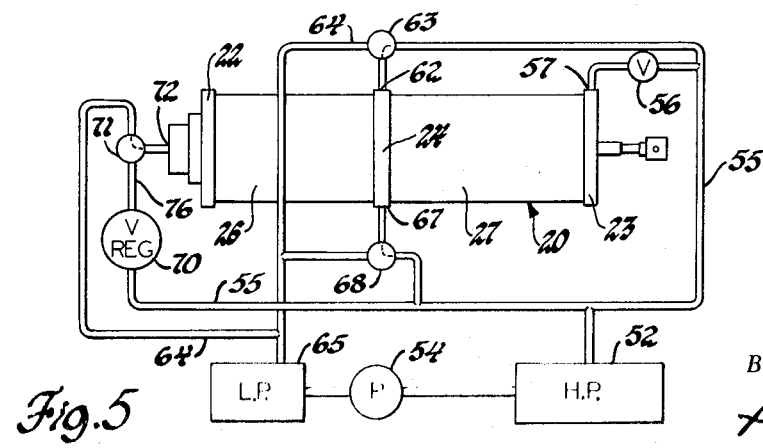

FIG. 5 is a schematic diagram of the pneumatic circuits involved in control of the actuating device.

Referring first to FIG. 1, a support or stand 2 supports in an elevated position a nacelle 3 within which is mounted a power plant of the well known military T56 type, otherwise known as Allison Model 501. The power plant includes a gas turbine engine and a reduction gear rigidly coupled to the engine (not shown in the drawings), and a propeller 4, which is driven by the engine and supported in known manner upon the reduction gear.

The nacelle is supported and the thrust of the propeller is taken by two trunnions 6 rotatably mounted in bearings 7 at the top of the stand 2. My invention relates to means for rotating the nacelle, engine, and propeller about the axis of the trunnions 6 so as to simulate loads placed on the power plant during abrupt pitching maneuvers, or the like, of an aircraft in which the power plant is used.

The stand 2 is a static arrangement of tubing welded together bolted to a suitable base 8. The details of the stand are immaterial to my invention, but it may be pointed out that at each side of the stand there are uprights 10 and 11 and braces 12, 14, 15, 16, and 18, the purpose of these being to provide a suitably rigid and strong elevated support for the power plant.

The accelerating-decelerating device which is the principal subject of this invention and which, for conciseness, will be called an "actuator" is indicated at 20. Externally it is a cylindrical pressure vessel comprising a first head 22, a second head 23, a diaphragm 24 between the heads, and cylindrical sections 26 and 27 defining a reservoir for gas under pressure. The lower end of the actuator is connected through trunnions at 28 to two upstanding brackets 30 fixed to a member 31 of the stand 2. The parts of the actuator so far described are fixed together; they may be threaded or they may be held together by through tie bolts or held together in any manner generally considered suitable for pneumatic cylinders and pneumatic pressure vessels. The details are immaterial to my invention.

A piston rod 32 extending from the upper end of the actuator terminates in a fitting 34 which is cross bored at 35 (see FIG. 2) to receive a pin 36 extending from a structural member 38 fixed to the nacelle 3 and the engine. By operating the actuator 20, the nacelle may be rotated from the solid line position as shown by the broken line renditions.

Proceeding now to FIGS. 2 through 5 for an explanation of the operation of the actuator 20, the cylindrical sections 26 and 27 and the heads 22 and 23 define a reservoir 39 for compressed gas which is in two sections partially separated by the diaphragm 24. The two sections of the reservoir communicate freely through a ring of holes 40 in the diaphragm 24. A first cylinder 42 open at one end extends to the left, as illustrated in FIG. 2, from the bulkhead 24 to which it is fixed. A second cylinder closed at both ends extends from the bulkhead 24 to the head 23. The piston rod 32, which extends through head 23, is fixed to a piston 44 slidable in cylinder 43. A piston 46 slidable in cylinder 42 is fixed to a piston rod 47 which extends through the diaphragm 24 and initially engages the assembly of piston 44 and rod 32. A second piston rod 48 fixed to piston 46 terminates in a disk or poppet 50 which acts as a trigger piston.

In the normal position of rest of the movable element comprising parts 46, 47, 48, and 50, the poppet 50 engages a seat 51 mounted in the head 22. As illustrated, the seat 51 is threaded so that by rotating the seat it is movable axially of the actuator for a purpose to be explained.

The reservoir 39 is charged with gas under pressure; specifically, in the application referred to, nitrogen at 2400 psi. Since the cylinder 42 is open, this pressure is exerted against the left face of piston 46. The reservoir 39 may be charged from an external high pressure reservoir 52 which is pressurized by a pump 54. The nitrogen (or other gas, if preferred) is supplied from reservoir 52 through a line 55 and a shutoff valve 56 to port 57 to charge the reservoir 39 to the desired pressure level, after which the valve 56 is closed. Valve 56 may be of a pressure regulating type, or reservoir pressure may be controlled manually. This pressure is applied to the differential piston comprising piston 46 and poppet 50. Since the port 57 also communicates with the space 58 in the interior of cylinder 43, the reservoir pressure is exerted against the right hand face of piston 44 as illustrated. The space 60 within cylinder 42 to the right of piston 46 as illustrated is a buffer or cushion space. Space 60 is charged to a proper pressure, about 7 psig in the example being described, through a charging port 62. As shown in FIG. 5, charging port 62 is connected to the external reservoir through line 55 and a three-way valve 63 by which the space may be supplied gas under pressure or vented through a discharge line 64 to a low pressure gas reservoir 65 (or, if preferred, to atmosphere).

The left hand end of cylinder 43, as illustrated, defines a chamber 66 which communicates through a charging port 67 with a three-way valve 68 by which chamber 66 may be fed gas under pressure or may be connected to exhaust line 64.

High pressure gas line 55 is also connected through a regulating valve 70 and a three-way valve 71 to a port 72 extending through the seat 51 and terminating in a pressure chamber 74 closed, in the position of the parts shown in FIG. 2, by the trigger piston 50. Valve 71 is effective to open the chamber 74 to vent line 64 as illustrated in FIG. 2, or to connect it to the pressure line 76 from the reservoir 52 and regulating valve 70 as illustrated in FIG. 3. It will be understood that the structures just described are constructed according to accepted principles of engineering of fluid pressure systems with suitable gas tight joints, piston rings, seals for the piston rod, and such, and pressure gauges, remote valve controls, and the like, as desired, but details of this sort are a mere matter of conventional design and not material to an understanding of my invention.

Proceeding now to the mode of operation of the actuator 20, the cycle is begun with the parts in the positions shown in FIG. 2. The reservoir is charged in the particular example to 2400 psi, cushion space 60 is charged to 7 psig, and the space 66 and pressure chamber 74 are vented. Pressure in reservoir 39 acting on piston 44 and poppet 50 biases them to the left as illustrated, and the same pressure acting on the left face of piston 46 biases it to the right as illustrated. In the preferred embodiment, the effective area of piston 44, that is the area of the piston less the area of piston rod 32, is half that of piston 46, which is piston 46 area less rod 47 area. The left face of piston 44 is vented. The total leftward force is greater than the force to the right and, therefore, pistons 46 and 44 are at the left limits of travel and the trigger piston 50 is seated over chamber 74, closing the chamber. To initiate a stroke of the apparatus, valve 71 is operated to feed gas under pressure into chamber 74. At some level of pressure within this chamber the total force exerted to the right on both sets of moving elements exceeds that exerted to the left, and the piston 46 and the other moving elements of cylinder 42 begin moving to the right forcing piston 44 and the other moving elements of cylinder 43 with them. As soon as the trigger piston 50 is unseated as indicated in FIG. 3, the high reservoir pressure is applied to the left face of this piston and thus the force becomes highly unbalanced, since the piston 50 no longer has any effective pressure difference exerted on it. Thus, the large piston 46 forces the small piston 44 with it, projecting the rod 32 with high acceleration. The capacity of reservoir 39 is preferably such that no great reservoir pressure drop, preferably not over five percent, occurs during this action. While there is expansion into cylinder 42, there is some expulsion of gas from cylinder 43 into the reservoir 39.

As piston 46 moves to the right, it compresses the air within the cushion chamber 60, the pressure rising slowly with displacement at first and then rapidly and, at some point, the piston 46 is decelerated and is stopped short before bumping into diaphragm 24. Piston 46 then may oscillate and come to rest near diaphragm 24.

Since piston 44 is at or near atmospheric pressure at its left face and is working against reservoir pressure at its right face, the piston is then rapidly decelerated. Since, as stated, the effective area of piston 44 is half that of piston 46, it equals the differential of area between pistons 46, 44. As a result, the piston 44 is decelerated by reservoir pressure at a rate substantially equal to the prior acceleration until it reaches the end of its stroke, which must occur before the piston 44 collides with head 23.

The piston 44 is carried ahead by the inertia of the nacelle 3 and its contents. FIG. 4 illustrates the termination of the acceleration stroke and the beginning of the deceleration portion of the stroke. It will be noted that piston 44 has parted from piston rod 47.

Some means is needed, of course, to prevent the reservoir pressure from driving piston 44 in the reverse direction to strike forcibly against piston rod 47. This is quite simply and satisfactorily provided by the one-way stop or ratchet arrangement 82 shown in FIG. 1. A rectangular strut 83 pivoted to the structural member 38 on the nacelle slides through a guide 86 mounted on the stand 2. This strut is provided with ratchet teeth 87 on two faces, which teeth are engageable by spring-urged pawls 88. The pawls allow the strut 83 to move upward but block its downward movement. Thus, when the acceleration-deceleration stroke has been completed, the nacelle remains at rest.

Now to reset the actuator for a succeeding cycle, first valve 68 is moved to the position indicated in FIG. 5 to admit gas under pressure to the left side of piston 44 and extend the piston rod 32 slightly so as to free the pawls 88. The pawls then are retracted by suitable mechanism, which is immaterial to my invention, and held clear of the ratchet teeth 87. Valve 67 is then actuated to bleed pressure out of the chamber 66, so that the reservoir pressure exerted against the right face of piston 44 pushes it against the end of rod 47. The space to the left of piston 44 is then fully vented. Under these conditions, the reservoir pressure acting upon piston 46 retains the parts in intermediate position.

The next step is to actuate valve 63 to force gas into chamber 60 and thus drive piston 46 to the left until trigger piston 50 is seated. Valve 71 is then actuated to reduce pressure in chamber 74 so that the trigger piston 50 is inactive. Valve 63 is then actuated to reduce the pressure in cushion chamber 60 to the appropriate value to snub the piston 46 on its next stroke. The ratchet pawls 88 are then put in position to be effective.

The pressure regulating valve 70 is set slightly above the triggering pressure in chamber 74. It prevents undesired flow when the trigger piston is unseated.

Because of the elastic properties of the gas and the sufficient capacity to the reservoir 39, the actuator is given a substantially linear acceleration followed by deceleration of substantially the same magnitude. The parts under test may be instrumented with strain gauges or otherwise to measure the effect of this acceleration and deceleration upon them. Also, the parts may be tested for failure if there is any structural deficiency. It will be noted that the rate of acceleration is a function almost entirely of two variables, the inertia or moment of inertia of the load and the pressure to which the reservoir 39 is charged. Thus, the acceleration may be greatly varied and may be smoothly varied over a wide range. Also, by varying the position of seat 51, the starting point of the stroke may be varied so that the length of the stroke is variable by infinitesimal increments.

It should be clear from the foregoing to those skilled in the art that I have devised an extremely simple and effective force-exerting device for the purpose described and one which may be scaled to suit any particular installation and which may be employed to actuate linearly, or rotate, any type of device under test.

The particular example described herein is quite large, being capable of exerting 100,000 pounds force when charged to 2500 psi and having a stroke of four feet.

The detailed description of the preferred embodiment of the invention for the purpose of explaining the principles thereof is not to be considered as limiting or restricting the invention, as many modifications may be made by the exercise of skill in the art without departing from the spirit of the invention.

I claim:

1. A motor system for imparting a controlled acceleration-deceleration cycle to a device to be tested comprising, in combination, a first cylinder; a second cylinder coaxial with the first; a piston slidable in the first cylinder with a piston rod extending into the second cylinder; a piston slidable in the second cylinder with a piston rod extending from the second cylinder in the direction away from the first cylinder; the second piston having approximately half the effective area of the first; means to apply a fluid pressure in opposition to both pistons to accelerate both pistons through the stroke of the first piston, means to stop the first piston, and means to apply the fluid pressure to the second piston to decelerate the second piston during overtravel beyond the stroke of the first piston.

2. A motor system for imparting a controlled acceleration-deceleration cycle to a device to be tested comprising, in combination, a first cylinder; a second cylinder coaxial with the first; a piston slidable in the first cylinder with a piston rod extending into the second cylinder; a piston slidable in the second cylinder with a piston rod extending from the second cylinder in the direction away from the first cylinder; the second piston having approximately half the effective area of the first; means to apply a fluid pressure in opposition to both pistons to accelerate both pistons through the stroke of the first piston, means to stop the first piston, and means to apply the fluid pressure to the second piston to decelerate the second piston during overtravel beyond the stroke of the first piston, the means to apply the fluid pressure comprising a fluid pressure reservoir forming an integral assembly with the said cylinders.

3. A motor system for imparting a controlled acceleration-deceleration cycle to a device to be tested comprising, in combination, first and second expansible-chamber motors, each motor including a cylinder and means movable with respect to the cylinder including a piston and a piston rod; the cylinders being fixed together and the movable means of the first motor being engageable with the movable means of the second motor; means for supplying fluid under pressure to the first motor to accelerate both movable means; a trigger piston fixed to the movable means of the first cylinder and normally exposed to the pressure of the fluid to hold the movable means in an initial position; means to apply fluid pressure to the other face of the trigger piston to initiate movement of the movable means; means for stopping the first movable means; and means to apply fluid pressure to the second movable means to decelerate the second movable means during its overrun from the first movable means; the cylinders and the second movable means being connectable between elements to be relatively accelerated.

4. A pneumatic motor system for successively accelerating and decelerating a load comprising, in combination, a pressure vessel including first and second heads and a diaphragm intermediate the heads, the vessel defining a reservoir for gas under pressure; a first cylinder extending from the diaphragm and having an opening into the reservoir; a second cylinder coaxial with the first and extending from the diaphragm to the second head, the second cylinder being of less area and longer than the first; a first movable element including a piston slidable in the first cylinder, a rod extending from the first cylinder into the second, and a poppet engageable with the first head; a second movable element engageable with the first movable element and including a piston slidable in the second cylinder and a rod extending from the second cylinder; means for applying pressure through the first head against the poppet to initiate a stroke of the first piston and thereby accelerate the second piston; and means providing communication between the reservoir and the second cylinder to oppose the force of the first piston and to decelerate the second piston after termination of the stroke of the first piston.

5. A pneumatic motor system for successively accelerating and decelerating a load comprising, in combination, a pressure vessel including first and second heads and a diaphragm intermediate the heads, the vessel defining a reservoir for gas under pressure; a first cylinder extending from the diaphragm and having an opening into the reservoir; a second cylinder coaxial with the first and extending from the diaphragm to the second head, the second cylinder being of less area and longer than the first; a first movable element including a piston slidable in the first cylinder and a rod extending from the first cylinder into the second; a second movable element engageable with the first movable element and including a piston slidable in the second cylinder and a rod extending from the second cylinder; means to initiate a stroke of the first piston and thereby accelerate the second piston; means providing communication between the reservoir and the second cylinder to oppose the force of the first piston and to decelerate the second piston after termination of the stroke of the first piston; means effective to hold the second piston upon termination of its stroke; and means for controllably returning both pistons to their initial positions.

6. A pneumatic motor system for successively accelerating and decelerating a load comprising, in combination, a pressure vessel including first and second heads and a diaphragm intermediate the heads, the vessel defining a reservoir for gas under pressure; a first cylinder extending from the diaphragm and having an opening into the reservoir; a second cylinder coaxial with the first and extending from the diaphragm to the second head, the second cylinder being of less area and longer than the first; a first movable element including a piston slidable in the first cylinder, a rod extending from the first cylinder into the second, and a poppet engageable with the first head; a second movable element engageable with the first movable element and including a piston slidable in the second cylinder and a rod extending from the second cylinder; means for applying pressure through the first head against the poppet to initiate a stroke of the first piston and thereby accelerate the second piston; means providing communication between the reservoir and the second cylinder to oppose the force of the first piston and to decelerate the second piston after termination of the stroke of the first piston; means effective to hold the second piston upon termination of its stroke; and means for controllably returning both pistons to their initial positions.

7. A motor system for imparting a controlled acceleration-deceleration cycle to a device to be tested comprising, in combination, a first cylinder; a second cylinder coaxial with the first and of smaller diameter than the first; a piston slidable in the first cylinder with a piston rod extending into the second cylinder; a piston slidable in the second cylinder with a piston rod extending from the second cylinder to provide an output from the system; the second piston having a longer stroke than the first; means to apply a fluid under pressure in opposition to both pistons to accelerate both pistons through the stroke of the first piston, and means to apply the fluid under pressure only to the second piston to decelerate the second piston during overtravel beyond the stroke of the first piston.

8. A motor system for imparting a controlled acceleration-deceleration cycle to a device to be tested comprising, in combination, a first cylinder; a second cylinder coaxial with the first and of smaller diameter than the first; a piston slidable in the first cylinder with a piston rod extending into the second cylinder; a piston slidable in the second cylinder with a piston rod extending from the second cylinder in the direction away from the first cylinder to provide an output from the system; the second piston having a longer stroke than the first; means to apply a fluid under pressure in opposition to both pistons to accelerate both pistons through the stroke of the first piston, and means to apply the fluid under pressure only to the second piston to decelerate the second piston during overtravel beyond the stroke of the first piston.

* * * * *